C. E. BALKEMA.
CORN GATHERING AND HUSKING MACHINE.
APPLICATION FILED JAN. 12, 1899. RENEWED NOV. 26, 1910.
996,604.
Patented July 4, 1911.
7 SHEETS—SHEET 1.
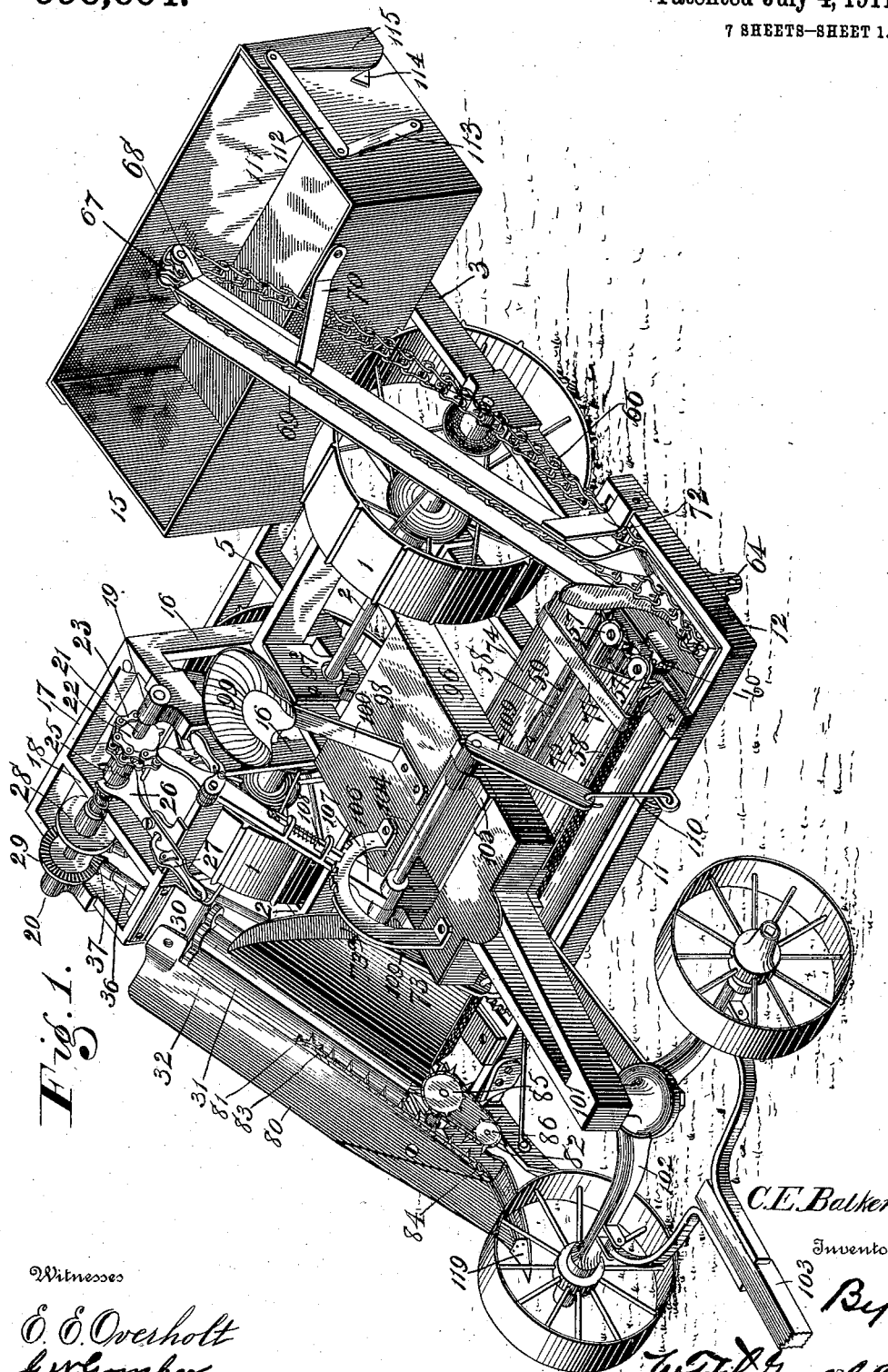

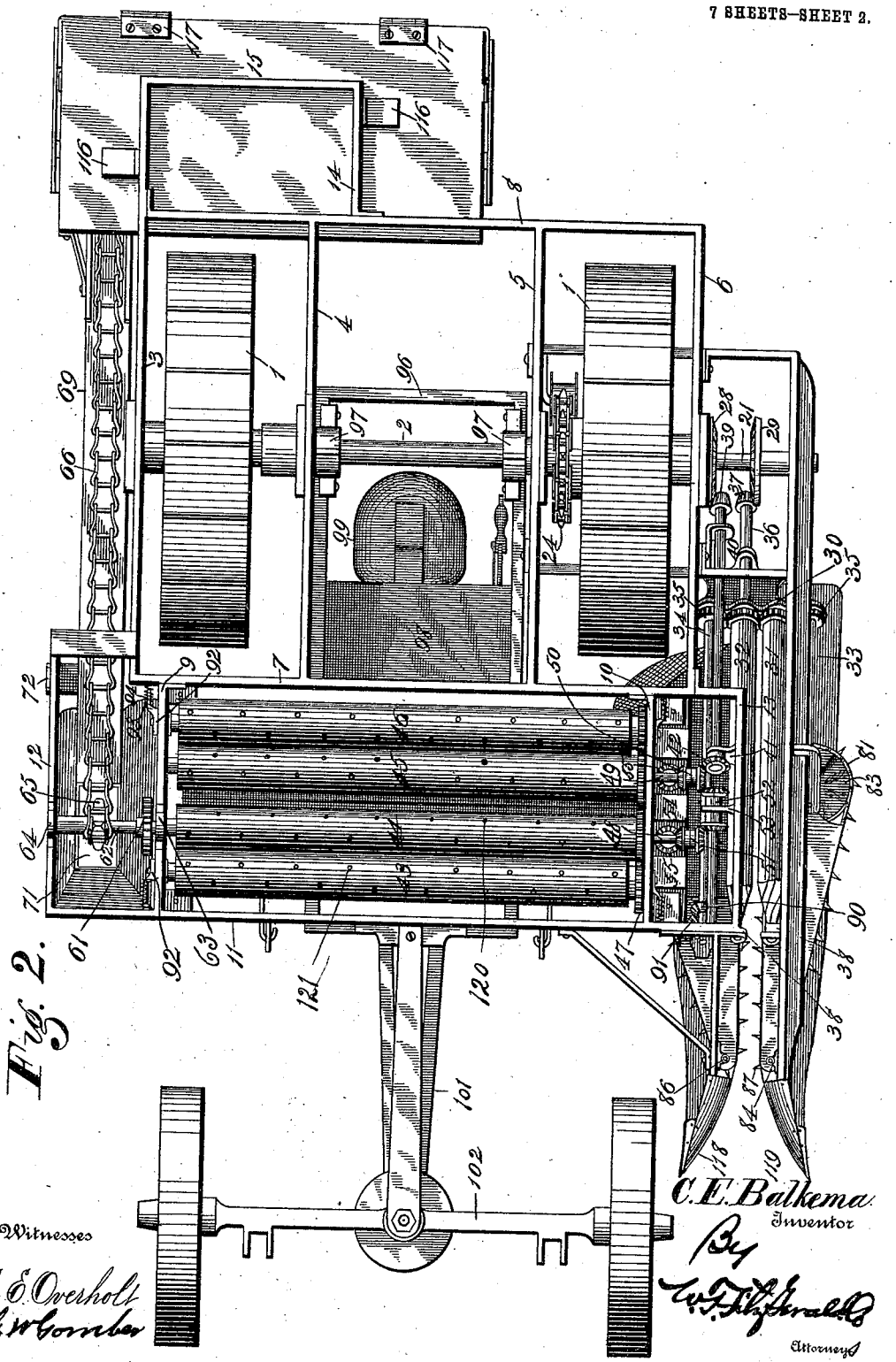

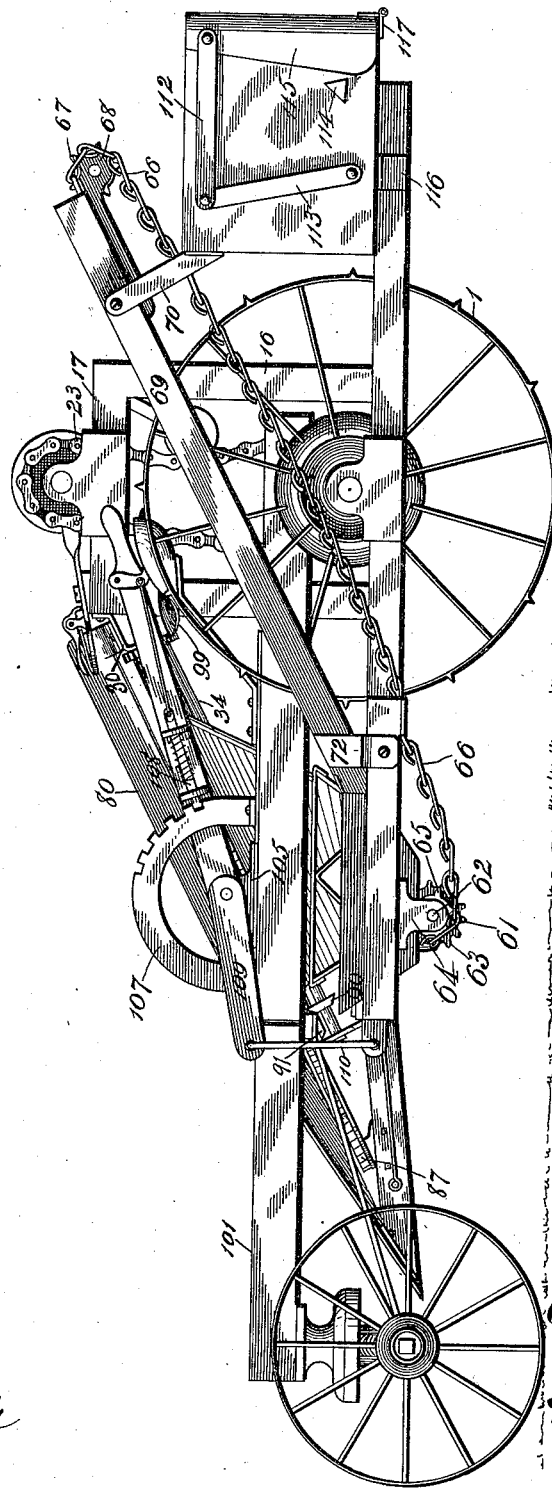

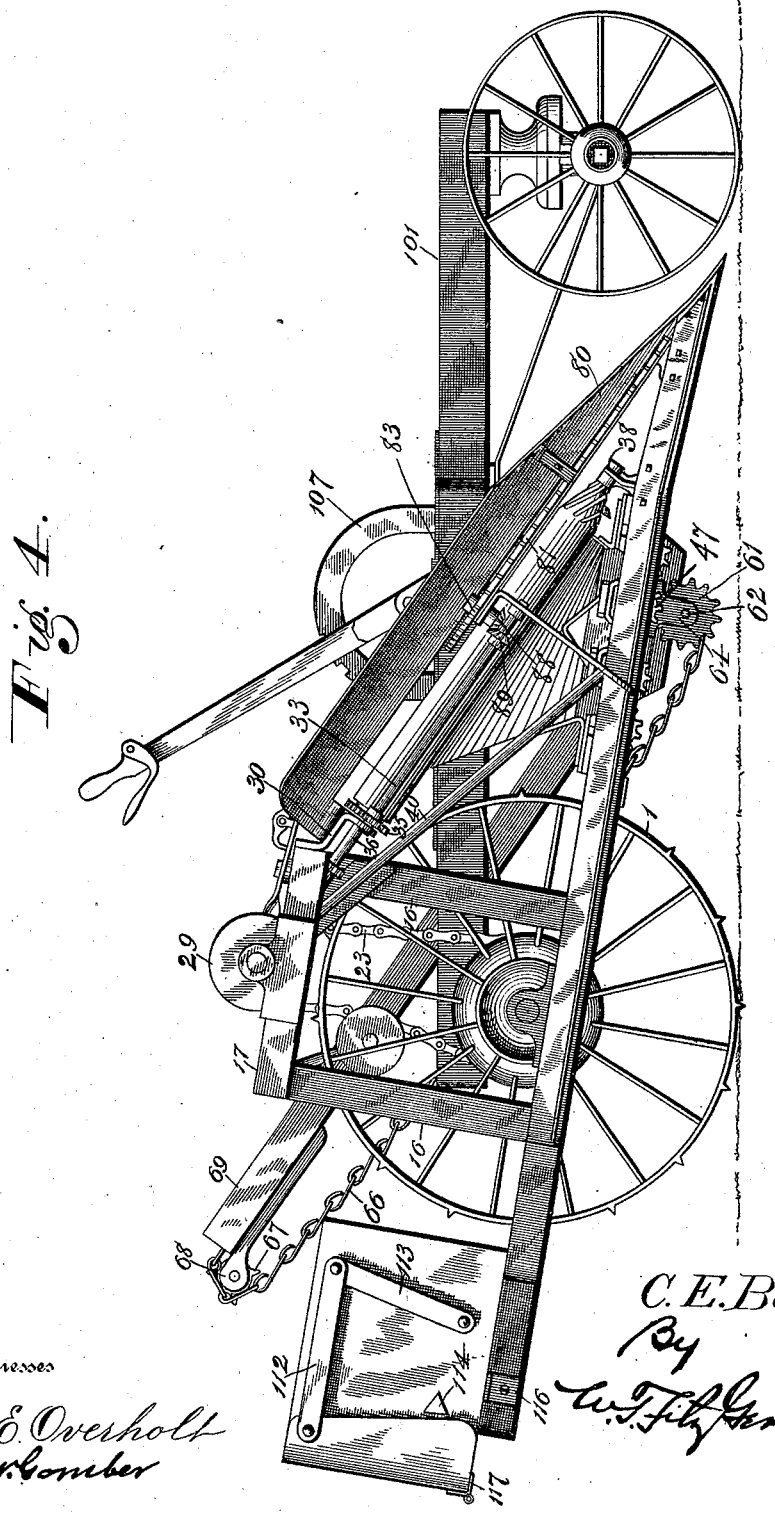

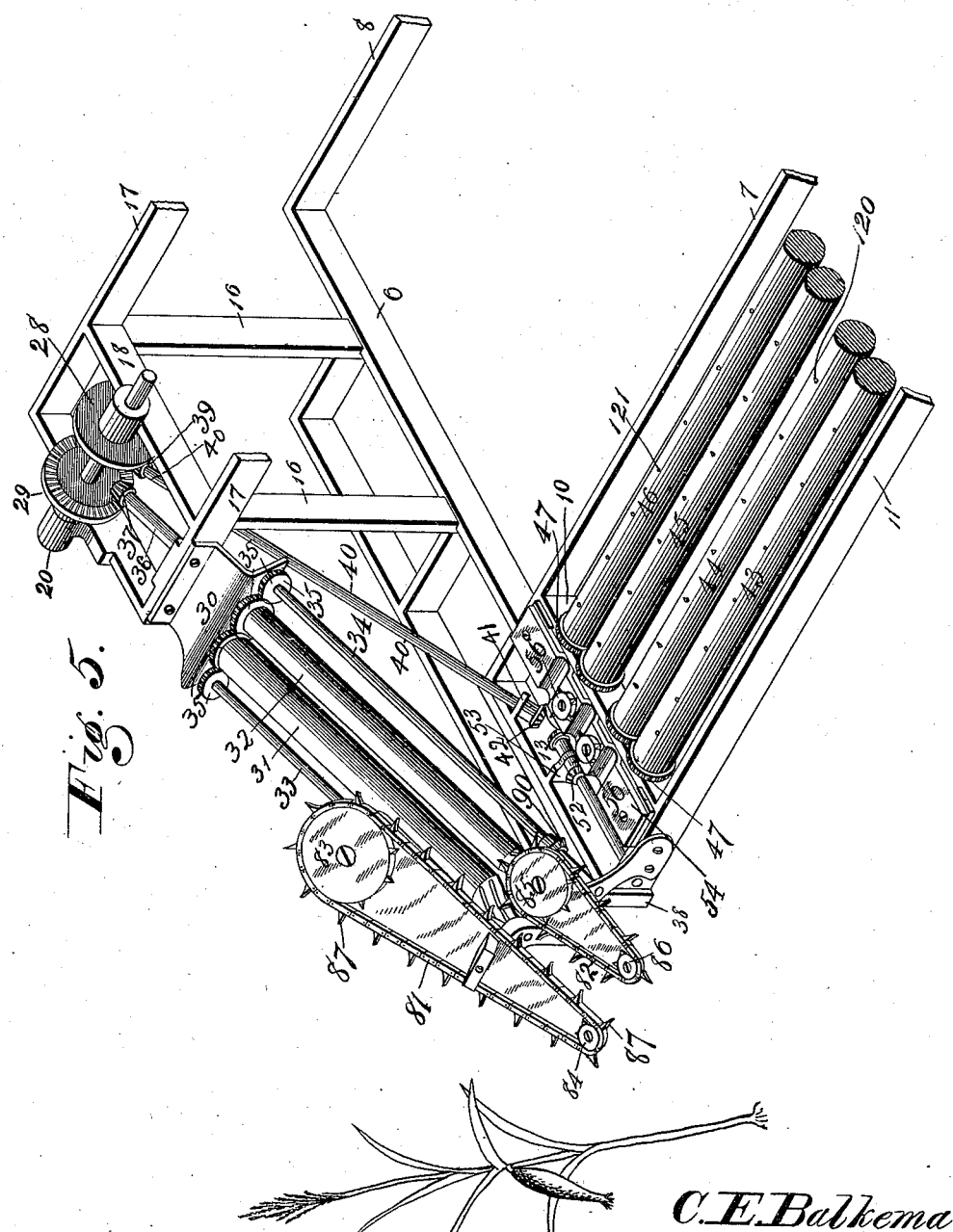

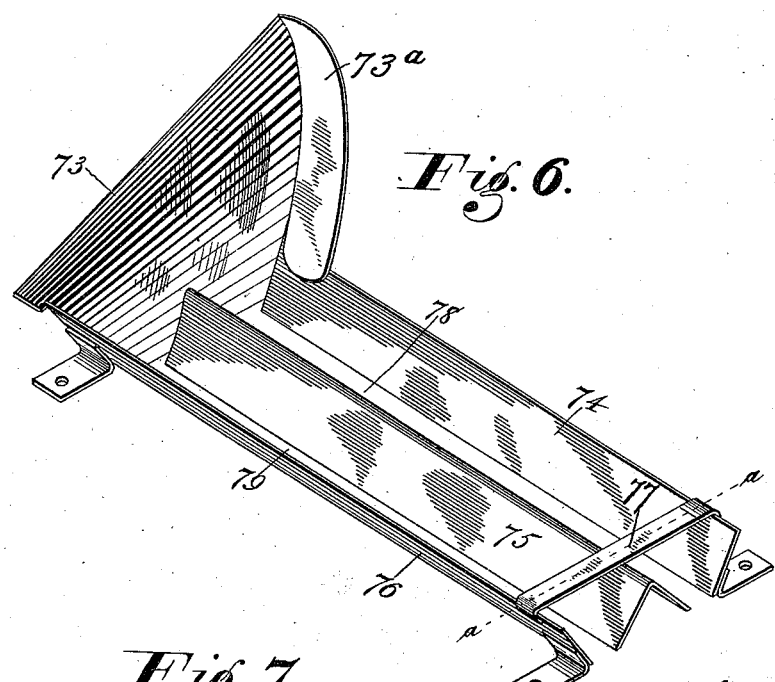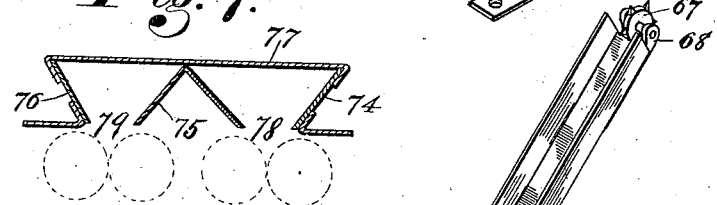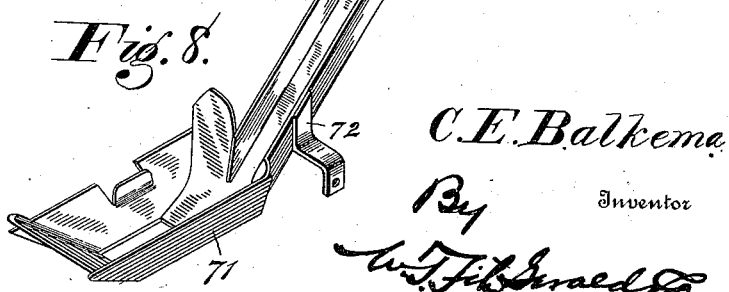

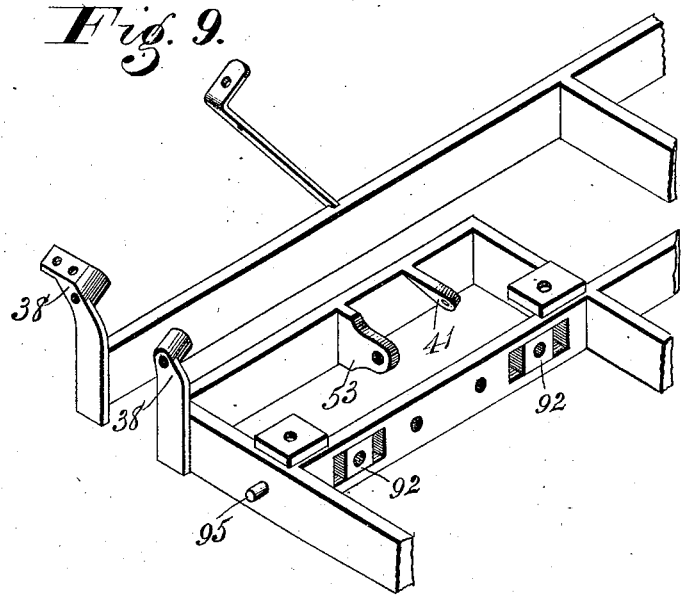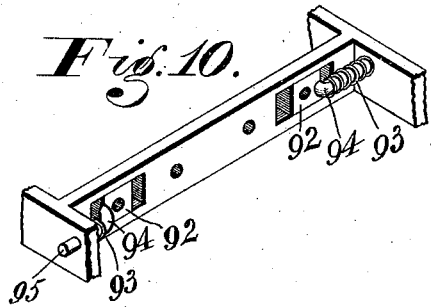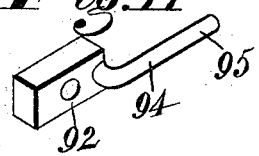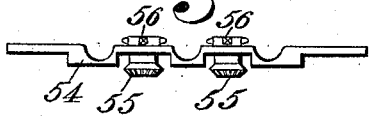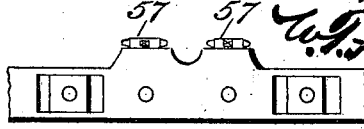

UNITED STATES PATENT OFFICE.

CHARLES EDWARD BALKEMA, OF BADGERS, INDIANA.

CORN GATHERING AND HUSKING MACHINE.

996,604. Specification of Letters Patent. Patented July 4, 1911.

Application filed January 12, 1899, Serial No. 701,986. Renewed November 26, 1910. Serial No. 594,402.

*To all whom it may concern:*

Be it known that I, CHARLES EDWARD BALKEMA, a citizen of the United States, residing at Badgers, in the county of White and State of Indiana, have invented certain new and useful Improvements in Corn Gathering and Husking Machines; and I do hereby declare the following to be a full, clear, and exact description of the invention, such as will enable others skilled in the art to which it appertains to make and use the same.

The object of my invention is to provide a corn husking machine which may be taken into the field of ripened grain and not only pluck the ears from the standing stalks, but will also remove the husks from the ear and leave the latter in a desirable, merchantable condition, ready for shipment or storage. By the use of my improved corn-gathering and husking machine, I am therefore enabled to dispense with the slow tedious and expensive process of gathering and husking the corn by hand, the result being that this standard grain may be produced at a lower cost than in case the hand process of gathering is employed.

The advantages, therefore, of my invention will, it is thought, be readily apparent from the following specification, considered in connection with the accompanying drawings, in which, Figure 1 is a perspective view of my corn gathering and husking machine in its complete operative condition; Fig. 2 is a bottom plan view thereof; Fig. 3 is a side elevation showing my corn husking machine in its complete operative condition, said view being taken from the right side as shown in Fig. 1; Fig. 4 is a side elevation taken from an opposite point from that illustrated in Fig. 3; Fig. 5 is a perspective detail of a portion of the frame, and the mechanism carried thereby; Fig. 6 is the preferred housing or casing employed to protect certain operative parts; Fig. 7 is a transverse section of Fig. 6 on line *a a;* Fig. 8 illustrates the preferred construction to be employed in providing the elevating chute, and the receiving end thereof; Fig. 9 is a perspective detail of a portion of the carrying frame; Figs. 10 and 11 are detail views, showing means for adjusting the lower rollers in the desired position; Fig. 12 shows the preferred form of plate for securing the inner ends of the cleaning rollers, while Fig. 13 shows a portion of the section of the frame illustrated in Fig. 10, showing the opposite side thereof.

While I have illustrated the preferred construction for the several parts constituting my invention, and the accessories deemed most desirable to place the same in operative combination, it will be understood that the substantial equivalent thereof is comprehended in this application, and that any changes or modifications falling fairly within the scope of my invention may be made, as my main desire is to provide certain mechanism for first stripping the ear of corn from the stalk, and in certain devices for removing any adhering husks, "silk", or the like from the ear, and additional means for conveying the ear of corn in its stripped or cleaned condition, into a receptacle, which, when filled, may be readily relieved of its contents, which latter may be readily placed in an adjacent vehicle of suitable character.

I am aware that attempts have been made to produce a machine for husking and gathering the corn direct from the field, but the result has been that the corn is very roughly treated, leaving it in a shattered, or partly shelled condition, and incidentally causing great waste, inasmuch as the grains separated from the cob fall upon the ground and are lost, a further disadvantage being due to the fact that the corn is left in an unattractive condition, and therefore undesirable as marketable grain.

Briefly described, my invention consists of improvements in a fodder gathering and husking machine, which will first act upon the ear while attached to the stalk, in such a manner that the ear will be moved longitudinally and forced out of the husk, and will be so acted upon thereafter by additional mechanism that any remaining particles of husk will be thoroughly removed, the operation of separating the ear from its husks being performed without injuring the former, as by loosening or shattering any of the grain from the cob.

Referring in detail to the construction shown, 1 indicates the rear carrying wheels, provided with a suitable supporting axle 2, mounted in suitable bearings in the parallel frame sections 3, 4, 5 and 6, the forward ends of which are secured to, or integrally formed with the forward end section 7, while the rear ends of said sections are integrally formed with or attached to the rear section 8. To the forward section 7 I attach in any preferred way, the forwardly reaching sections 9 and 10, each preferably integrally formed with the front frame section 11, provided with the lateral extensions 12 and 13, the rear ends of which are respectively secured to the adjacent parallel sections 3 and 6. To the rear section 8 I secure the rear extension or bracket 14 designed to support the receptacle 15, which will be hereinafter specifically referred to. Upon the frame sections 5 and 6, preferably over the carrying wheel, I erect upon suitable standards 16 the rectangular frame 17, preferably provided with the partition or intermediate section 18, said parts being designed to carry the bearings 19 and 20, the latter being adapted to receive and operatively support the ends of the shaft 21 upon which is secured the driving sprocket 22, which, by means of the sprocket chain 23, is operatively connected with the driving shaft 2, as by a suitable sprocket wheel 24 keyed to said shaft. The shaft 21 is also provided with the clutch 25, formed substantially in the usual way and provided with the controlling lever 26, and the locking or auxiliary lever 27, by means of which said clutch is operated and the machine thrown in or out of gear, inasmuch as the sprocket wheel 22 is loosely mounted upon its shaft and cannot cause the latter to rotate except when the clutch 25 is in proper or operative position, as will be readily understood. The shaft 21 also has fixedly secured thereto the beveled gears 28 and 29, the office of which will be hereinafter set forth. To the forward side of the frame section 17, I secure the bracket 30, in which I mount in suitable bearings the upper ends of the stripping rollers 31 and 32, and also the driving shafts 33 and 34, as will be seen by reference to Fig. 2. It will also be seen by reference to Figs. 2 and 5 that the shafts 33 and 34, and the stripping rollers 31 and 32, are operatively connected with each other, as by the gears 35, each of said members being provided with a gear 35, all of which are in mesh with each other, and by means of which motion is imparted to each of said members by means of the extended journal 36 formed upon the upper end of the stripping roller 32, a beveled gear 37 being fixedly secured to the upper end of the extension 36, which is designed to mesh with the beveled gear 29 from which power is obtained.

Each of the stripping rollers 31 and 32 is provided with suitable journals upon their lower ends, which are mounted in bearings carried by the brackets 38, thus insuring that said rollers will be held in an adjusted position, said adjustment being made with a view to receiving between said rollers the stalks of corn to be acted upon, as it is by means of said rollers that the ear is forced out of its husk, and at the same time permitting the stalk to remain standing in the field.

Designed to mesh with the gear 28 is the beveled gear 39 fixedly secured to the shaft 40, which latter is mounted in suitable bearings carried by the frame section 17 and the bracket 41 attached to the inner side of the extension 13, the lower end of the shaft 40 having secured thereto the beveled gear 42. Mounted within suitable bearings, preferably adjustable in form, in the frame sections 9 and 10, and between the sections 7 and 11 are the cleaning rollers 43 and 44, 45 and 46, each being provided with a gear wheel 47, the outer pairs of which are in mesh with each other, and by means of which a uniform movement or rotation is imparted to each pair of said rollers, it being understood that the inner pair of gears 47 are out of mesh or contact with each other.

By reference to Fig. 2 it will be seen that the cleaning rollers 44 and 45 are provided, respectively, with the extended ends or journals 48 and 49, the latter being provided with the pair of beveled gears 50, while the former carries a pair of beveled gears 51. The outer face of the double wheel 50 is designed to mesh with the beveled gear 42, from which power is derived, and by means of which all of said rollers are actuated.

By reference to Fig. 2 it will be further observed that the outer face of the wheel 50 is also in mesh with one face of the double wheel 52, which is mounted in a suitable bracket 53, as it is by means of said wheel 52 that motion is imparted to the double wheel 51, it being understood that it is necessary to so rotate the cleaning rollers 43, 44, 45 and 46 that said rollers will be divided into pairs and each roller moved toward its complement.

Mounted above the shafts 48 and 49 in suitable bearings provided in the retaining plate 54, are the beveled gears 55, designed to mesh with the inner faces of the double wheels 50 and 51, each of said wheels being held in position by suitable shafts which extend through the bearings in the plate 54 and have attached to their upper ends the sprocket wheels 56, which, in connection with the idler sprocket wheels 57, mounted upon the section 9, are designed to carry the sprocket chains 58, having the series of fingers or teeth 59, the purpose of which will be hereinafter fully set forth.

The opposite end of the roller 44 from that upon which the journal 48 is located, is provided with an extended journal upon which is secured the gear 60 (Fig. 1) designed to mesh with the gear 61, which latter is mounted upon the shaft 62 rotatably secured in position as by the brackets 63 and 64, the middle section of said shaft being provided with the sprocket wheel 65, designed to actuate the conveyer or sprocket chain 66, the upper end of said chain being arranged to pass over the idler sprocket wheel 67 mounted in suitable brackets 68 in the upper end of the chute 69, the upper end of said chute being reinforced or sustained as by the brace or supporting arm 70 secured to the receptacle 15.

The lower end of the chute 69 terminates in the receptacle or hopper 71, said parts being preferably integrally formed of one piece of suitable sheet metal, see Fig. 8 the hopper being held in position as by the bracket 72 carried by the frame section or extension 12. Designed to coöperate with the stripping and cleaning rollers is the shield or housing shown in Fig. 6, and consisting of the end extension 73, having the guiding flange 73ᵃ designed to coöperate with the stripping rollers 43, 44, 45 and 46, and also having the guiding sections 74, 75 and 76, the inner ends of which are properly secured to the shield section 73, while the outer ends thereof are held into operative relationship, as by the brace 77, it being understood that the said sections 74, 75 and 76 are so disposed with respect to each other that the clearance or open spaces 78 and 79 are left between them, the object being to expose only the fingers 59 carried by the sprocket chains 58 in order that the ears of corn may be directed by said chains into the hopper 71.

Designed to coöperate with the shield section 73 is the housing or guiding plate 80, the office of said parts being to inclose the stripping rollers 31 and 32 in such a manner that only the approximate surfaces thereof will be exposed or left free for the reception of the standing stalk.

In order that the stalks of corn may be successively received between the rollers 31 and 32 and more positively fed into coöperation with said rollers, I provide the sprocket chains 81 and 82, the former being carried by suitably mounted sprocket wheels 83 and 84, while the latter is carried by the sprocket wheels 85 and 86, each of said chains being provided with a series of fingers 87, as will be seen by reference to Figs. 1 and 2, the office of said fingers being to insure that the stalks of corn will be positively engaged by the chains and directed between the rollers 31 and 32, which latter will, when properly adjusted, so act upon the ear of corn that it will be forced out of its husk and thus leave the latter remaining upon the stalk. The chain 82 is relatively short, there being above its upper end an unobstructed passage from the stripping rolls to the cleaning rolls through which the corn ears can readily pass from one set of rolls to the other.

In order that movement may be imparted to the sprocket wheel 83, I locate upon the lower end of the shaft upon which said wheel is mounted, the beveled gear 88 designed to mesh with the beveled gear 89, secured to the lower end of the shaft 33, the upper end of said shaft, as previously explained, being provided with the driving gear 35. In like manner a rotary movement is imparted to the sprocket wheel 85: that is to say, the lower end of the shaft 34 is provided with the beveled gear 90 so located upon said shaft that it will coöperate with the beveled gear 91 carried by the lower end of the shaft upon which the sprocket wheel 85 is mounted.

In order that each pair of cleaning rollers, 43, 44 and 45, 46, may be held snugly in contact with each other, and yet be provided with the capacity to separate to permit the passage of a thick piece of husk, or the like, I prefer to mount the journaled ends of the rollers 43 and 46 in adjustable bearing blocks 92, as more clearly shown in Figs. 9 and 10, said blocks being held normally inward by any suitable means, as by the spring 93, disposed around the stem 94, one end of which is securely attached to its respective block while the free end 95 thereof extends loosely through a suitable aperture provided in the contiguous portion of the frame. It is clear, therefore, that by this construction, which is identical for each of the journals carried by the rollers 43 and 46, and for such reason the same numerals will be employed to designate the parts at both ends, a capacity is imparted to each pair of rollers to separate sufficiently to permit the free passage between them of a thick portion of the husks or other matter which would impart a great strain to the journals of said rollers in the absence of the adjustability of the bearings just referred to.

In order to provide an adjustability for the forward end of the frame, I provide an auxiliary frame consisting of the rectangular frame section 96, which is secured to the axle by means of the bearing blocks or brackets 97, said frame being provided with the platform 98 designed to provide a vantage point for the seat 99, held in position upon said platform by the standard 100.

The forward end of the frame section 96 is provided with the extension 101 designed to coöperate with the forward carrying truck 102, provided with suitable tongue or draft appliance 103, and by means of which my improved gathering and husking machine is drawn over the ground. In order that the frame section proper, consisting of the several sections referred to, may be readily adjusted by the operator, when occupying the seat 99, I provide upon the platform 98 the transversely disposed shaft 104, mounted in suitable bearings 105, and provided with the operating lever 106, the latter being designed to coöperate with the usual rack-bar 107 by means of the manually controlled detent 108, as it is obvious that by placing said detent in one of the notches upon said rack-bar, the crank arms 109 secured to each end of the shaft 104 will be correspondingly moved and since the ends of said crank arms are pivotally connected to the forward portion 11 of the lower frame, as by a chain or link 110, the forward edge of said lower frame section may be elevated or depressed at the will of the operator. I prefer to so construct all of the several parts forming the elements of my invention, and the necessary coöperating accessories therefor, of strong, though lightly formed angle iron, steel, or the like, said parts being as lightly formed as the requirements in each case may permit.

The wheels are preferably constructed with a broad tread or tire, while the requisite lightness and strength may readily be obtained by the utilization of wire spokes and small metallic hubs.

It is obvious that various modifications may be adopted in forming the several parts of my invention as it will be unnecessary to strictly follow the exact lines laid down herein, since any reasonable departure therefrom is comprehended by me in this application.

After the corn has been severed from the stalk upon which it grew, and delivered free of its husk and "silk", into the receptacle or hopper 71, and from thence elevated into the receptacle 15, the latter receptacle when filled, may be readily delivered of its contents by driving the machine to a convenient crib or housing, or such contents may be delivered into an adjacent vehicle, and, in order to facilitate the removal of the contents from the receptacle 15, I prefer to hinge the rear wall 111 to the bottom, thus leaving the free edge of the rear wall in condition to be moved outward and, in order that the rear wall may be left in an inclined position, I provide the pivoted arms or members 112 and 113, adapted to extend outward, an undue extension thereof being prevented by the retaining block or stop 114, as shown in Figs. 1, 3 and 4. I prefer to extend the edges of the rear wall 111 at right angles to said wall, or parallel with the end walls of the receptacle, thus forming the retaining sections 115, which, as will be readily apparent, will enable the rear wall to be greatly inclined and yet prevent the contents of the receptacle from falling out past the end walls.

The receptacle 15 may be permanently, or detachably secured to the bracket 14, as by the securing plates 116, as shown in Fig. 2, the hinges 117 for the rear wall 111 also being shown in said view and in Figs. 3 and 4. In order that the row of corn which it is designed to gather may be more reliably acted upon by the stripping rollers 31 and 32, I provide the gathering points 118 and 119, which, as will be seen by reference to Fig. 2, are disposed outside of the path of the truck 102 ready for the reception of the corn, said gathering points or guards 118 and 119 reliably directing each succeeding stalk of corn into coöperation with the teeth or chains 87, and by such directed into engagement with the rollers 31 and 32.

Having thus fully described the construction of my improved corn husking and gathering machine, the operation thereof may be stated to be as follows: After all of the several parts of my husking machine have been assembled in their respective operative positions, such machine is drawn over the ground in the usual manner so that the guiding points 118 and 119 will pass upon either side of the row of stalks, when the teeth or chains 87 will engage the same and prevent them from being bent forward: the stripping rollers will ride upon the stalk until the ear is reached, when said rollers will engage the same and so act upon the incasing husks thereof that the ear proper will be snapped off, close to the grain or cob and forced out of the husk, when it will fall down the inclined walls 73, 74, 75 and 76 and will then be acted upon by the teeth 59, carried by the chains 58, and moved toward the hopper or receptacle 71 into which it will fall: during the travel of the ear from the lower end of the shield 73 to the receptacle or hopper 71, the rollers 43, 44, 45 and 46 will engage any remaining portion of husk or "silk" adhering to the ear and will draw the same downward where it will fall upon the ground and thus leave the ear completely free from such adhering substances, it being understood that the rollers 44 and 45 may be provided with a series of small points as indicated by the numeral 120 in Fig. 5, while the outer rollers may be provided with a series of apertures 121 designed to register with, and receive said points, the object of the points being to engage the ears of corn as they are moving toward the hopper 71 and rotate, or partly turn the same in order to insure that any adhering husk upon the ear will drop into engagement with the rollers below it. The husked corn is removed from the receptacle or hopper 71 into the receptacle 15 by the sprocket chain 66, as it is clear that since said chain extends across the bottom of the hopper and thence upward through the inclined chute 69, the ears of corn will be engaged by said chain and positively direct- ed into said receptacle, which latter may be formed in any desired shape, extent, or capacity.

The parts connecting the axles of the front and rear ground wheels and supporting the operator's seat and the controlling mechanism for raising and lowering the snapping rollers may be considered as a truck frame, and the frame parts carrying the snapping rollers, the cleaning rollers and their operating parts may be considered as a supplemental or swinging frame pivotally connected to the truck frame.

Having thus fully described my invention, what I claim as new and desire to secure by Letters Patent, is—

1. In a corn harvesting and husking machine, the combination of a truck-frame, a supplemental frame hinged to the truck-frame, stripping rollers inclined upward and rearward and arranged longitudinally of the supplemental frame at one side thereof, cleaning rollers mounted on the supplemental frame near the front end and transversely of the machine, and means for delivering corn laterally from the stripping rollers, to the cleaning rollers, substantially as set forth.

2. In a corn harvesting and husking machine, the combination of a truck-frame having rear ground wheels and front ground wheels, a supplemental frame pivoted to the truck-frame at the axis of the rear ground wheels, stripping rollers inclined upward and rearward and arranged longitudinally of the supplemental frame, cleaning rollers on the supplemental frame between the transverse vertical plane of the upper end and the transverse vertical plane of the lower end of the stripping rollers, and means for delivering corn laterally from the sides of the stripping rollers to the cleaning rollers, substantially as set forth.

3. In a corn harvesting and husking machine, the combination of a truck-frame mounted upon rear ground wheels and front ground wheels, a supplemental frame hinged to the truck frame, stripping rollers inclined upward and rearward and arranged longitudinally of the supplemental frame, cleaning rollers on the supplemental frame between the transverse vertical planes of the upper ends and the transverse vertical planes of the lower ends of the stripping rollers, means for delivering corn laterally from the sides of the stripping rollers, and means for tilting the supplemental frame relative to the truck frame, substantially as set forth.

4. In a corn harvesting and husking machine, the combination of a truck frame, a vertically adjustable frame hinged to the said truck frame and arranged to have a part thereof below the truck frame and a part thereof above the truck frame, stripping rollers arranged longitudinally of the frames and inclined upward and backward and having their upper ends above the truck frame, and transversely arranged cleaning or husking rollers situated under the truck frame and at right angles to the stripping rollers, whereby the stalks are held in the vertical planes of the corn rows while engaged by the machine and the corn ears pass laterally therefrom to the cleaning rollers, substantially as set forth.

5. In a corn harvesting and husking machine, the combination of a truck frame, a vertically adjustable frame hinged thereto having a front lower part beneath the truck frame and a rear part situated above the truck frame, longitudinally arranged stripping rollers inclined upward and backward and having their lower ends mounted in the lower part of the adjustable frame and their upper ends mounted in the elevated part of the adjustable frame, cleaning or husking rollers on the adjustable frame beneath the truck frame, means for delivering corn laterally from the stripping rollers to the cleaning rollers, and power transmitting mechanism in the upper part of the adjustable frame for driving all of the said rollers, substantially as set forth.

6. In a corn harvesting and husking machine, the combination of a truck frame, a vertically swinging frame hinged to the truck frame, longitudinally arranged stripping rollers on the swinging frame, transversely arranged cleaning or husking rollers on the swinging frame, a longitudinally arranged upwardly and rearwardly inclined elevator receiving corn from the cleaning or husking rollers, a counter-shaft on the swinging frame parallel to the rear axle of the truck frame, and power transmitting devices between said axle and the counter shaft and between said counter-shaft and the aforesaid rollers, substantially as set forth.

7. In a harvesting and husking machine, the combination of a truck frame, wheels supporting the rear end of the truck frame, supplemental wheels supporting the front end of the truck frame, a swinging frame hinged to the truck frame and extending backward from, and forward from the axis of the rear wheels, an elevator extending from the front part of the swinging frame backward and upward over the rearwardly extending part of the swinging frame, transversely mounted cleaning or husking rolls in front of the axis of the rear truck wheels, longitudinally arranged stripping rolls inclined backward and upward across the vertical planes of the axes of the cleaning or husking rolls, and means for guiding the corn ears from the stripping rolls to the husking or cleaning rolls, substantially as set forth.

8. The combination of the supporting framework, the ground wheels for said framework, the upward and backward inclined stripping rolls, the transversely arranged husking or cleaning rolls between the transverse vertical planes of the rear ends of the stripping rolls and the front ends of the stripping rolls, means whereby the corn ears are directed from the stripping rolls to the transverse husking or cleaning rolls, and the gathering chains at the lower ends of the stripping rolls, one on each side of the path of the stalks, substantially as set forth.

9. The combination of the framework, the wheels supporting said framework, the transversely arranged husking or cleaning rolls mounted at the front of the frame, the stripping rolls mounted longitudinally of the framework and inclined upward and backward, the relatively long gathering chain on the side of the stalk passage opposite the husking rolls, and the relatively short gathering chain on the same side of the stalk passage as the husking rolls and arranged to leave a passageway above it for the corn ears to pass from the stripping rolls to the husking or cleaning rolls, substantially as set forth.

10. The combination of the supporting framework, the ground wheels therefor, the longitudinally arranged upward and backward inclined elevator, at one side of the frame work, the transversely arranged husking or cleaning rolls mounted on the front of the frame, the stripping rolls inclined upward and backward and arranged at the side of the frame opposite the said elevator, and means for conducting the corn ears laterally from the stripping rolls to the transversely arranged cleaning or husking rolls, substantially as set forth.

11. The combination of the framework, the supporting and driving ground wheels, the elevator arranged longitudinally of the machine at one side thereof, the transversely arranged cleaning or husking rolls on the frame at the front side thereof, the stripping rolls arranged longitudinally of the machine and inclined upward and rearward, the elevated counter-shaft, the power transmitting device between the axle of the driving wheels and the counter-shaft, a train of power transmitting devices between the counter-shaft and the stripping rolls, a supplemental train of power transmitting devices between the counter-shaft and the cleaning or husking rolls, and a power transmitter connecting the husking or cleaning rolls with the elevator, substantially as set forth.

12. The combination of the frame, the rear wheels, the front ground wheels for the frame swiveled thereto, the transversely arranged cleaning or husking rolls mounted at the front part of the frame, the stripping rolls inclined upward and backward and arranged longitudinally of the frame, and means for raising and lowering the stripping rolls and the cleaning or husking rolls relatively to the swiveling front wheels, substantially as set forth.

In testimony whereof I affix my signature, in presence of two witnesses.

CHARLES EDWARD BALKEMA.

Witnesses:
ALBERT R. JAMISON,
GEO. A. JAMISON.

---

Copies of this patent may be obtained for five cents each, by addressing the "Commissioner of Patents. Washington, D. C."